US012567153B2

(12) United States Patent
Hsu et al.

(10) Patent No.: US 12,567,153 B2
(45) Date of Patent: Mar. 3, 2026

(54) ELECTRONIC DEVICE AND METHOD FOR SELECTING REGION OF INTEREST IN IMAGE

(71) Applicant: Industrial Technology Research Institute, Hsinchu (TW)

(72) Inventors: Kuo-Huang Hsu, Taoyuan City (TW); An-Kai Jeng, Hsinchu City (TW)

(73) Assignee: Industrial Technology Research Institute, Hsinchu (TW)

( * ) Notice: Subject to any disclaimer, the term of this patent is extended or adjusted under 35 U.S.C. 154(b) by 353 days.

(21) Appl. No.: 18/299,707

(22) Filed: Apr. 12, 2023

(65) Prior Publication Data

US 2024/0289961 A1 Aug. 29, 2024

(30) Foreign Application Priority Data

Feb. 24, 2023 (TW) ................................. 112106992

(51) Int. Cl.
| | |
|---|---|
| *G06T 7/11* | (2017.01) |
| *G06T 7/174* | (2017.01) |
| *H04N 7/01* | (2006.01) |

(52) U.S. Cl.
CPC ................ *G06T 7/11* (2017.01); *G06T 7/174* (2017.01); *H04N 7/0127* (2013.01); *G06T 2207/30241* (2013.01); *G06T 2207/30261* (2013.01)

(58) Field of Classification Search
CPC . G06T 7/11; G06T 7/174; G06T 2207/30241; G06T 2207/30261; H04N 7/0127; H04N 19/167; G06V 10/25; G06V 10/96; G06V 20/58; G06V 20/56
See application file for complete search history.

(56) References Cited

U.S. PATENT DOCUMENTS

| | | | | |
|---|---|---|---|---|
| 7,848,237 | B2 | 12/2010 | Todd et al. | |
| 8,296,813 | B2 * | 10/2012 | Berkey .......... | H04N 21/234381 |
| | | | | 725/96 |
| 10,250,923 | B2 * | 4/2019 | Gilson ............. | H04N 21/47217 |
| 10,780,881 | B2 | 9/2020 | You | |
| 10,805,696 | B1 * | 10/2020 | Suiter ................ | H04N 21/8545 |
| 11,048,927 | B2 * | 6/2021 | Russell .................. | G06V 20/58 |

(Continued)

FOREIGN PATENT DOCUMENTS

| | | |
|---|---|---|
| CN | 103987577 | 10/2017 |
| CN | 114119955 | 3/2022 |

(Continued)

OTHER PUBLICATIONS

J. Meessen et al., "WCAM: Smart Encoding for Wireless Surveillance", SPIE, Image and Video Communications and Processing 2005, Mar. 14, 2005, pp. 14-25, vol. 5685.

(Continued)

*Primary Examiner* — Mia M Thomas
(74) *Attorney, Agent, or Firm* — JCIPRNET

(57) ABSTRACT

Disclosed are an electronic device and a method for selecting a region of interest in an image. The method includes the following steps: receiving an image; using the image to obtain a plurality of regions of interest, wherein each of the plurality of regions of interest corresponds to an object danger level value; and using the object danger level value to select a first region of interest from the plurality of regions of interest.

14 Claims, 5 Drawing Sheets

(56) References Cited

U.S. PATENT DOCUMENTS

| | | | | |
|---|---|---|---|---|
| 11,284,021 B1 * | 3/2022 | Cardei | G06F 9/5038 |
| 11,301,692 B2 * | 4/2022 | Oami | G06V 40/23 |
| 11,556,126 B2 * | 1/2023 | Hammond | G05D 1/0257 |
| 12,131,637 B2 * | 10/2024 | Takada | G08G 1/137 |
| 2014/0300466 A1 * | 10/2014 | Park | G08B 19/00 |
| | | | 340/539.11 |
| 2015/0328985 A1 * | 11/2015 | Kim | A61B 5/746 |
| | | | 180/272 |
| 2015/0332103 A1 * | 11/2015 | Yokota | G06F 16/5854 |
| | | | 348/149 |
| 2016/0275642 A1 * | 9/2016 | Abeykoon | G06V 10/25 |
| 2018/0308202 A1 * | 10/2018 | Appu | G06T 1/20 |
| 2019/0035154 A1 * | 1/2019 | Liu | G06V 30/195 |
| 2019/0087198 A1 * | 3/2019 | Frascati | H04N 9/79 |
| 2020/0288066 A1 * | 9/2020 | Candelore | H04N 23/64 |
| 2020/0317190 A1 * | 10/2020 | Tong | B60W 50/14 |
| 2020/0321374 A1 * | 10/2020 | Ion | G06N 3/04 |
| 2021/0027076 A1 * | 1/2021 | Hayashi | G06V 20/584 |
| 2021/0081676 A1 * | 3/2021 | Kim | G06V 20/47 |
| 2021/0182573 A1 * | 6/2021 | Sabeti | G06V 20/58 |
| 2021/0329413 A1 * | 10/2021 | Hsu | H04L 51/224 |
| 2021/0407223 A1 * | 12/2021 | Anabuki | G05D 1/0027 |
| 2022/0169245 A1 * | 6/2022 | Hieida | G08G 1/162 |
| 2022/0215201 A1 * | 7/2022 | Dwivedi | G06N 3/045 |
| 2022/0292827 A1 * | 9/2022 | Chen | G06F 16/786 |
| 2025/0191383 A1 * | 6/2025 | Hahn | B60W 50/14 |
| 2025/0292684 A1 * | 9/2025 | Muthiah | G08G 1/166 |

FOREIGN PATENT DOCUMENTS

| | | | | |
|---|---|---|---|---|
| DE | 102015216352 | | 3/2017 | |
| EP | 1862940 | | 12/2007 | |
| EP | 2461272 | | 6/2012 | |
| EP | 4421751 A1 * | 8/2024 | H04N 7/0127 |
| TW | I520612 | | 2/2016 | |
| TW | I560469 | | 12/2016 | |
| TW | I563825 | | 12/2016 | |
| TW | I636683 | | 9/2018 | |
| WO | 9949412 | | 9/1999 | |
| WO | WO-2020172842 A1 * | 9/2020 | G06T 7/12 |
| WO | WO-2023189084 A1 * | 10/2023 | B60W 50/14 |
| WO | WO-2024090328 A1 * | 5/2024 | H04N 7/181 |

OTHER PUBLICATIONS

Hui Li et al., "Dynamic region-based wavelet compression for telemedicine application", SPIE, Medical Imaging 1997: Image Display, May 7, 1997, pp. 851-859, vol. 3031.

"Search Report of Europe Counterpart Application", issued on Sep. 15, 2023, p. 1-p. 12.

Guntur Ravindra et al., "In-network Optimal Rate Reduction for Packetized MPEG Video", Q2SWinet '08, Oct. 27-28, 2008, pp. 55-61.

Ravindra G, N Balakrishnan et al., "Active Router Approach for Selective Packet Discard of Streamed MPEG video under Low Bandwidth Conditions", 2000 IEEE International Conference on Multimedia and Expo, Jul. 30, 2000-Aug. 2, 2000, pp. 739-742.

Anastasios Doulamis et al., "Optimal Multi-Content Video Decomposition for Efficient Video Transmission over Low-Bandwidth Networks", 2002 International Conference on Image Processing, Sep. 22-25, 2002, pp. II-201-II-204.

Zhenli Zhou et al., "A User-driven Interactive 3D Video Streaming Transmission System with Low Network Bandwidth Requirements", 2012 International Conference on Advanced Communication Technology, Feb. 19-22, 2012, pp. 1113-1116.

Anastasios Doulamis et al., "Content-based Video Adaptation in Low/Variable Bandwidth Communication Networks Using Adaptable Neural Network Structures", 2006 International Joint Conference on Neural Networks, Jul. 16-21, 2006, pp. 4037-4044.

Hexiang Qiao et al., "Crowd Intelligence Empowered Video Transmission in Ultra-low-bandwidth Constrained Circumstances", 2020 IEEE Intl Conf on Parallel & Distributed Processing with Applications, Big Data & Cloud Computing, Sustainable Computing & Communications, Social Computing & Networking (ISPA/BDCloud/SocialCom/SustainCom), Dec. 17-19, 2020, pp. 721-727.

Umang Goenka et al., "Threat Detection In Self Driving Vehicles Using Computer Vision", Machine Learning, Image Processing, Network Security and Data Sciences. Lecture Notes in Electrical Engineering, Sep. 6, 2022, pp. 1-15.

Young-Bin Shim et al., "A Study on Surveillance System of Object's Abnormal Behavior by Blob Composition Analysis", International Journal of Security and Its Applications, Mar. 31, 2014, pp. 333-340, vol. 8, No. 2.

"Office Action of Europe Counterpart Application", issued on Sep. 24, 2025, p. 1-p. 6.

* cited by examiner

ELECTRONIC DEVICE AND METHOD FOR SELECTING REGION OF INTEREST IN IMAGE

CROSS-REFERENCE TO RELATED APPLICATION

This application claims the priority benefit of Taiwan application serial no. 112106992, filed on Feb. 24, 2023. The entirety of the above-mentioned patent application is hereby incorporated by reference herein and made a part of this specification.

TECHNICAL FIELD

The present disclosure relates to an electronic device and a method for selecting regions of interest (ROIs) in an image.

BACKGROUND

At present, the technology of regions of interest in images has been widely adopted in many circumstances. For example, for images obtained by monitoring a specific location, if it is desired to transmit the complete images in a high-resolution manner, a higher transmission bandwidth is required. How to select regions of interest from an image to save the transmission bandwidth of the image is one of the goals that those skilled in the art are committed to achieve.

SUMMARY

The disclosure provides an electronic device and a method for selecting regions of interest (ROIs) in an image, which makes it possible to select the ROIs from the image more flexibly.

The electronic device of the present disclosure for selecting ROIs in an image includes a transceiver and a processor. The processor is coupled to the transceiver and configured to receive images through the transceiver; use images to obtain multiple ROIs, each of which corresponds to an object danger level value; and select the first ROI from the multiple ROIs by using the object danger level value.

The method for selecting ROIs in an image of the present disclosure includes the following steps: receiving images; using the images to obtain multiple ROIs and each of the plurality of ROIs corresponding to an object danger level value; and selecting the first ROI from multiple ROIs by using the object danger level value.

DETAILED DESCRIPTION OF DISCLOSED EMBODIMENTS

Figure 1:
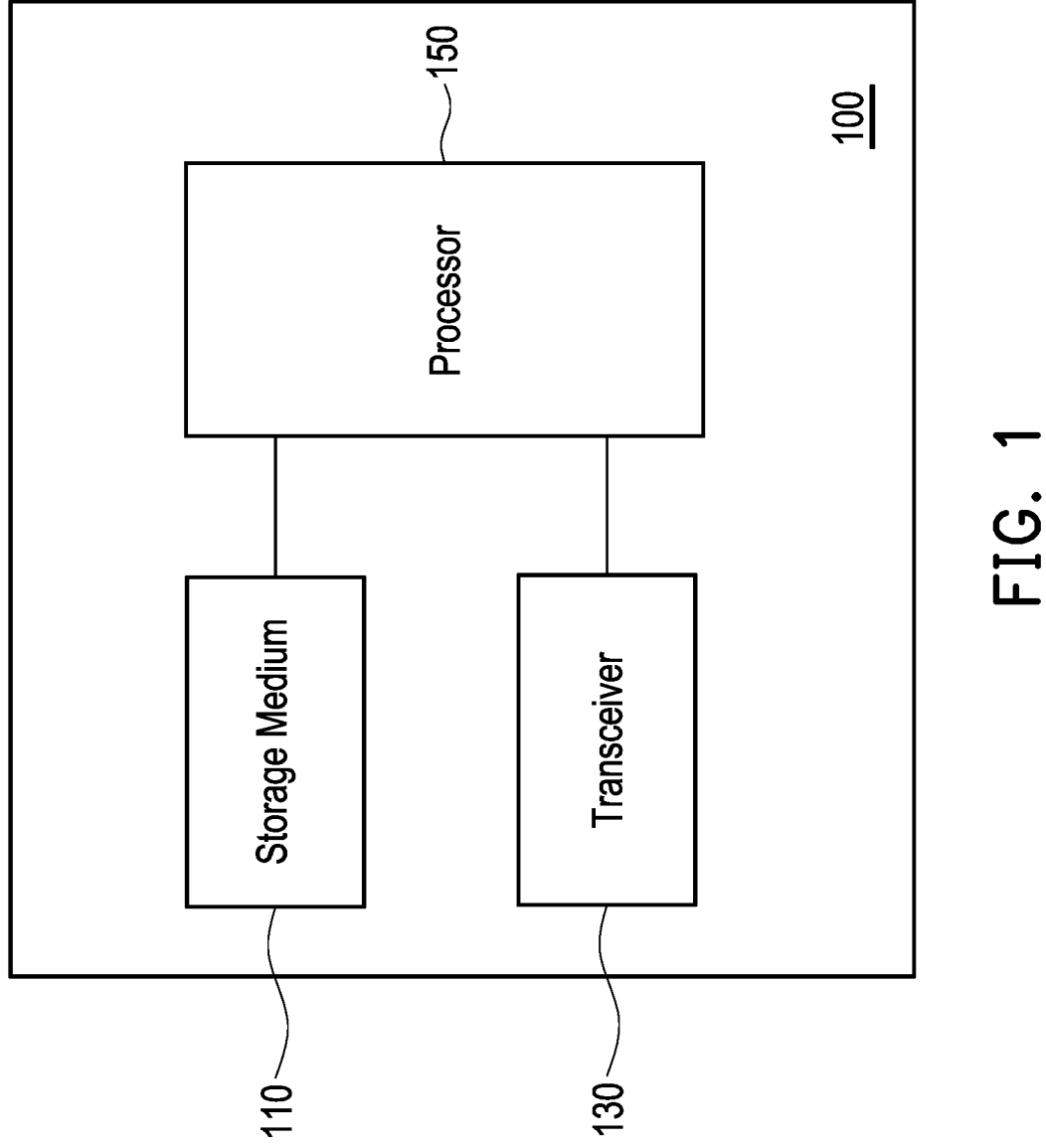
FIG. 1 is a schematic diagram of an electronic device for selecting regions of interest in an image according to an embodiment of the disclosure.

FIG. 1 is a schematic diagram of an electronic device 100 for selecting regions of interest in an image according to an embodiment of the disclosure. The electronic device 100 may include a storage medium 110, a transceiver 130 and a processor 150.

The storage medium 110 is, for example, any type of fixed or removable random access memory (RAM), a read-only memory (ROM), a flash memory, a hard disk drive (HDD), a solid state drive (SSD) or similar components or combinations of the above-mentioned components and is utilized for storing multiple modules or various disclosure programs executed by the processor 150.

The transceiver 130 transmits and receives signals in a wireless or wired manner.

The processor 150 is, for example, a central processing unit (CPU), or other programmable micro control unit (MCU) for general purpose or special purpose, a microprocessor, a digital signal processing (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable logic gate array (FPGA) or other similar components or combinations of the above-mentioned components. The processor 150 may be coupled to the storage medium 110 and the transceiver 130, and access and execute multiple modules and various application programs stored in the storage medium 110.

Figure 2:
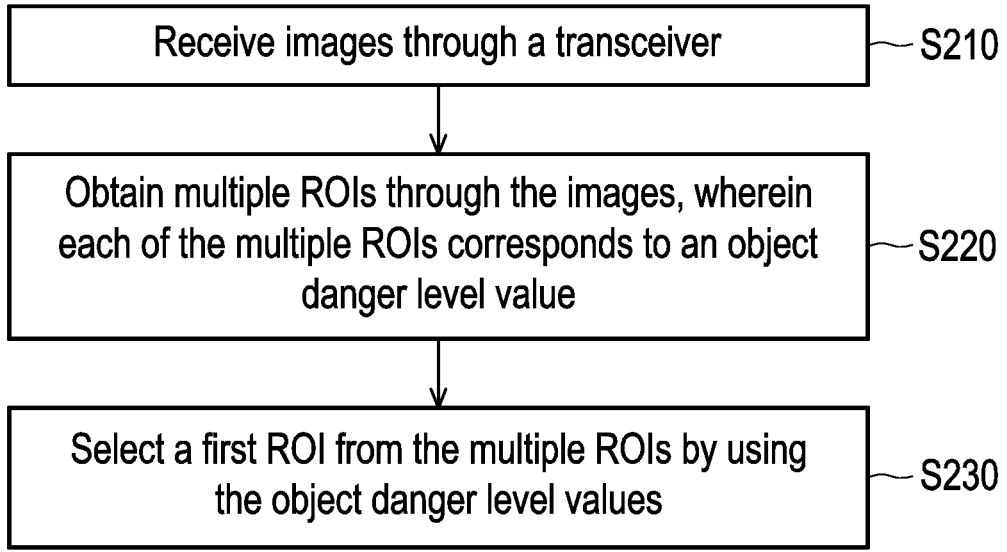
FIG. 2 is a flowchart of a method for selecting regions of interest in an image according to an embodiment of the disclosure.

FIG. 2 is a flowchart of a method for selecting regions of interest in an image according to an embodiment of the disclosure. Please refer to FIG. 1 and FIG. 2 at the same time. The method of the embodiment is applicable to the electronic device 100 in FIG. 1. The detailed steps of the method for selecting ROIs in an image in the present disclosure will be described below using each component of the electronic device 100.

In step S210, the processor 150 may receive images through the transceiver 130. Next, in step S220, the processor 150 may use the images to obtain multiple regions of interest (ROI), and each of the multiple ROIs corresponds to an object danger level value. For example, the processor 150 may execute the ROI extraction module (not shown) stored in the storage medium 110 to obtain multiple ROIs by using the images, and obtains the corresponding object danger level value of each of the ROIs. In an embodiment, the images are, for example, images obtained by monitoring a specific location, and the multiple ROIs are, for example, vehicles such as cars or motorcycles in the images, but the disclosure is not limited thereto.

Then, in step S230, the processor 150 may select a first ROI from the multiple ROIs by using the object danger level values. After the first ROI is selected, the processor 150 may use the first ROI of the image as the focus region, and performs image processing on regions outside the focus region, so that the resolution and/or color depth is lower than the focus region.

In an embodiment, the multiple ROIs may include the first ROI and many other ROIs. Furthermore, the object danger level value corresponding to the first ROI is greater than the object danger level value corresponding to each of the other ROIs. For instance, the processor 150 may sort the multiple ROIs according to the object danger level values, and uses the ROI with the highest object danger level value as the first ROI. In an embodiment, the first ROI is, for example, the (most dangerous) car closest to the intersection in the image of the specific intersection, but the present disclosure is not limited thereto.

In an embodiment, the object danger level value may be Time to Collision (TTC). In detail, the processor 150 may obtain the TTC of each ROI, and uses the ROI with the shortest TTC as the first ROI.

Figure 3:
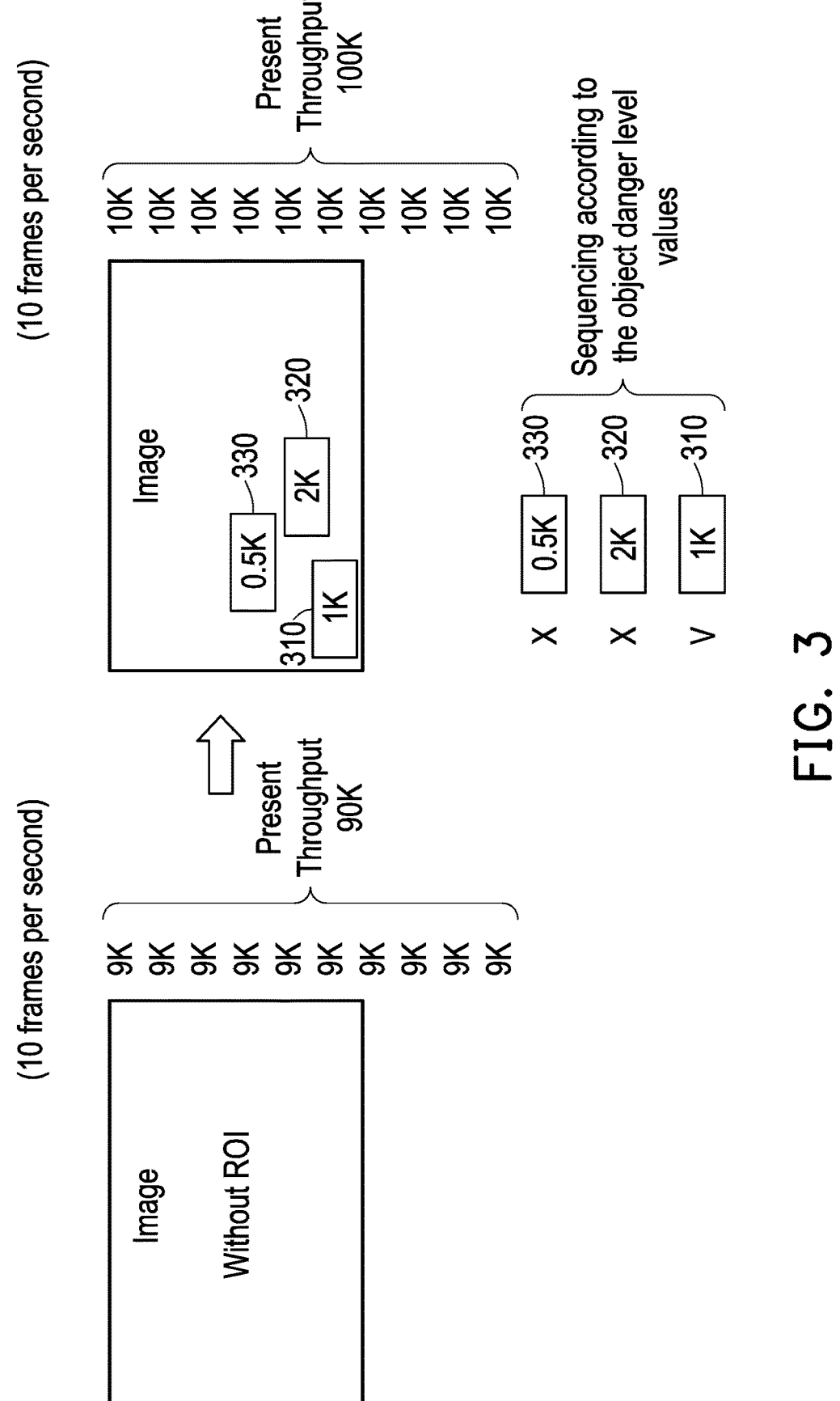
FIG. 3 is a schematic diagram of selecting regions of interest in an image according to an embodiment of the present disclosure.

FIG. 3 is a schematic diagram of selecting regions of interest in an image according to an embodiment of the present disclosure. Please refer to FIG. 1 and FIG. 3 at the same time. In the embodiment, it is assumed that the processor 150 obtains the ROI 310, the ROI 320, and the ROI 330 by using images. As described in the foregoing embodiments, the processor 150 may respectively obtain the object danger level values of the ROI 310, the ROI 320, and the ROI 330. It is assumed that the object danger level value of the ROI 310 is greater than the object danger level value of the ROI 320, and it is assumed that the object danger level value of the ROI 320 is greater than the object danger level value of the ROI 330. The processor 150 may use the ROI 310 with the highest object danger level value as the first ROI.

In the embodiment, it is assumed that the maximum throughput of the electronic device 100 is "100K bytes/s", and it is assumed that the minimum resolution data size value of a single image without ROI in the image shown in FIG. 3 is "9K bytes", and it is assumed that the number of frames per second (FPS) is "10". The processor 150 may use the maximum throughput "100K bytes/s" and the number of frames per second of "10" to determine the maximum data size value per frame to be "10K bytes/frame".

In the embodiment, the first ROI may correspond to the transmission bandwidth value of the first ROI. Furthermore, the ROI 310, the ROI 320 and the ROI 330 may respectively correspond to the transmission bandwidth values of the ROIs. In an embodiment, the processor 150 may execute the ROI extraction module (not shown) stored in the storage medium 110 to obtain the transmission bandwidth values of the ROIs. As shown in FIG. 3, it is assumed here that the ROI 310 (i.e. the first ROI) corresponds to the transmission bandwidth value of the first ROI "1K bytes", and the ROI 320 corresponds to the transmission bandwidth value of the ROI "2K bytes", and the ROI 330 corresponds to the transmission bandwidth value of the ROI "0.5K bytes".

In the embodiment, the sum of the minimum resolution data size value of the single image without ROI in the image and the transmission bandwidth value of the first ROI is less than or equal to the maximum data size value per frame. In other words, in the embodiment, the sum of the minimum resolution data size value of the single image without ROI, which is "9K bytes", and the transmission bandwidth value of the first ROI, which is "1K bytes", is less than or equal to the maximum data size value per frame, which is "10K bytes/frame" (9K+1K=10K). Therefore, after the first ROI is selected, the processor 150 may use the number of frames per second "10" to transmit the images including the first ROI. As shown in FIG. 3, the throughput per frame at this moment is the sum "10K bytes" of the minimum resolution data size value of a single image without ROI, which is "9K bytes", and the transmission bandwidth value of the first ROI, which is "1K bytes", and therefore the present throughput is "100K bytes/s", which would not exceed the maximum throughput "100K bytes/s" available to the processor 150. The processor 150 takes the first ROI of the image as the focus region, and performs image processing on regions outside the focus region, so that the resolution and/or color depth of the regions outside the focus region are lower than those of the focus region.

It is worth noting that since the sum of the minimum resolution data size value of a single image without ROI, which is "9K bytes", the transmission bandwidth value of the first ROI, which is "1K bytes", and the transmission bandwidth value of the ROI corresponding to the ROI 320, which is "2K bytes", is greater than the maximum data size value per frame, which is "10K bytes/frame" (9K+1K+2K>10K), in the embodiment, the processor 150 only selects the first ROI, and would not select the ROI 320. Similarly, the processor 150 would not select the ROI 330 either.

Figure 4:
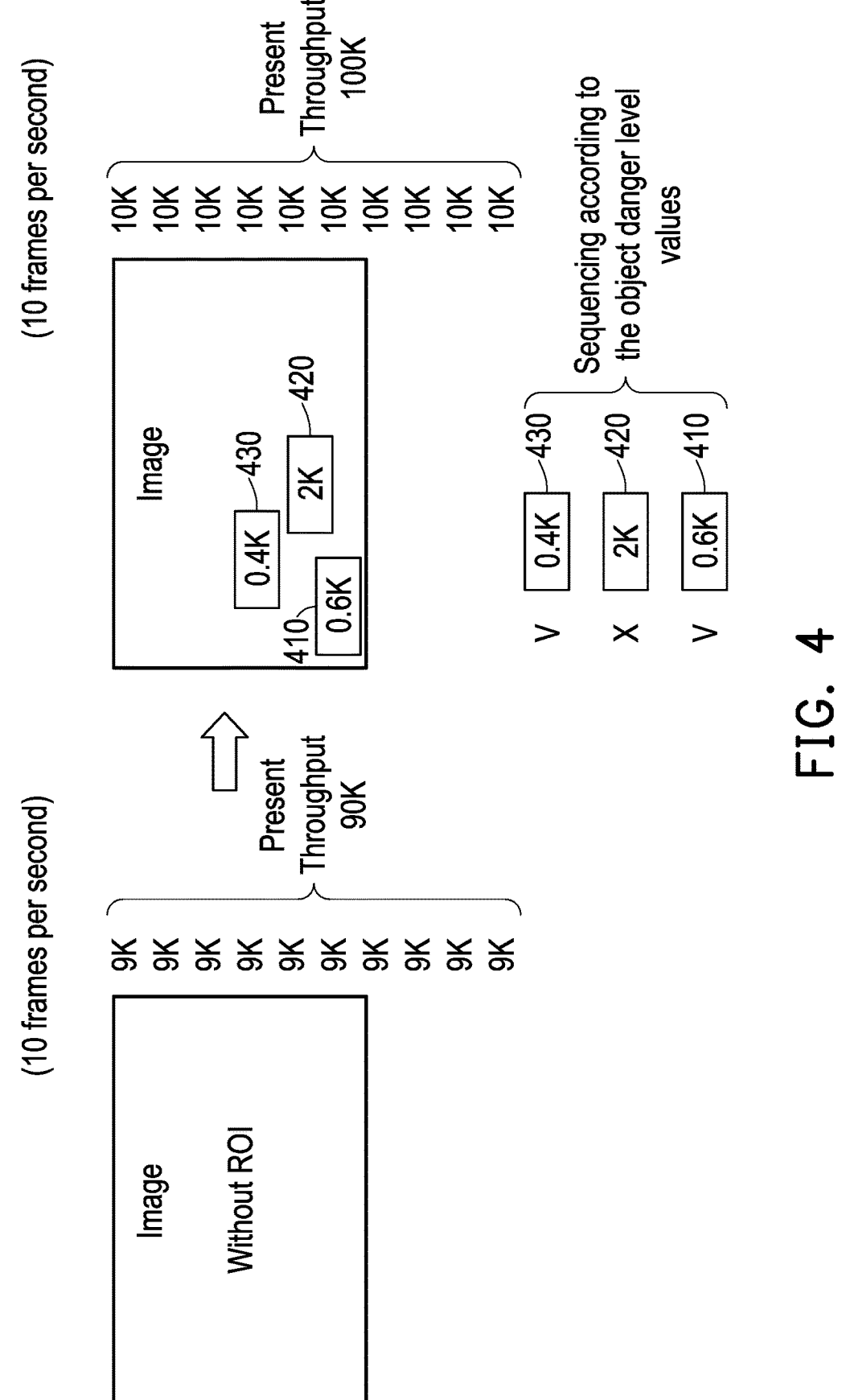
FIG. 4 is a schematic diagram of selecting regions of interest in an image according to another embodiment of the present disclosure.

FIG. 4 is a schematic diagram of selecting regions of interest in an image according to another embodiment of the present disclosure. Please refer to FIG. 1 and FIG. 4 at the same time. In the embodiment, it is assumed that the processor 150 acquires the ROI 410, the ROI 420, and the ROI 430 by using images. It is assumed that the object danger level value of the ROI 410 is greater than the object danger level value of the ROI 420, and it is assumed that the object danger level value of the ROI 420 is greater than the object danger level value of the ROI 430. The processor 150 may use the ROI 410 with the highest object danger level value as the first ROI.

In the embodiment, it is assumed that the maximum throughput of the electronic device 100 is "100K bytes/s", and it is assumed that the minimum resolution data size value of a single image without ROI in the image shown in FIG. 4 is "9K bytes", and it is assumed that the number of frames per second is "10". The processor 150 may use the maximum throughput of "100K bytes/s" and the number of frames per second of "10" to determine the maximum data size value per frame to be "10K bytes/frame".

As shown in FIG. 4, it is assumed here that the ROI 410 (i.e. the first ROI) corresponds to the transmission bandwidth value of the first ROI, which is "0.6K bytes", and it is assumed that the ROI 420 corresponds to the transmission bandwidth value of the ROI, which is "2K bytes", and it is assumed that the ROI 430 corresponds to the transmission bandwidth value of the first ROI, which is "0.4K bytes".

In the embodiment, the processor 150 may select a second ROI from the multiple ROIs, and the second ROI is different from the first ROI, and the second ROI corresponds to the transmission bandwidth value of the second ROI. The sum of the minimum resolution data size value of a single image without ROI in the image, the transmission bandwidth value of the first ROI, and transmission bandwidth of the second ROI is less than or equal to the maximum data size value per frame. In detail, as shown in FIG. 4, after taking the ROI 410 with the maximum object danger level value as the first ROI, the processor 150 may select a second ROI from the many other ROIs (that is, the ROI 420 and the ROI 430). Specifically, since the sum of the minimum resolution data size value of a single image without ROI, which is "9K bytes", the transmission bandwidth value of the first ROI, which is "0.6K bytes", and the transmission bandwidth value of the ROI corresponding to the ROI 420, which is "2K bytes" is greater than the maximum data size value per frame, which is "10K bytes/frame" (9K+0.6K+2K>10K), the processor 150 would not select the ROI 420 as the second ROI. On the other hand, since the sum of the minimum resolution data size value of a single image without ROI, which is "9K bytes", the transmission bandwidth value of the first ROI, which is "0.6K bytes", and the transmission bandwidth value of the ROI corresponding to the ROI 430, which is "0.4K bytes" is less than or equal to the maximum data size value per frame, which is "10K bytes/frame" (9K+0.6K+ 0.4K=10K), the processor 150 would select the ROI 430 as the second ROI. After selecting the second ROI, the processor 150 may use the first ROI and the second ROI of the image as the focus region, and performs image processing on regions outside the focus region, so that the resolution and/or color depth of the regions outside the focus region are lower than that of the focus region.

It should be noted that although the embodiment is described by an example that the processor 150 selects one second ROI, the present disclosure does not specify the number of the second ROIs. That is to say, in other embodiments, as long as the sum of the minimum resolution data size value of a single image without ROI, the transmission bandwidth value of the first ROI, and the transmission bandwidth value of each second ROI is less than or equal to the maximum data size value per frame, the processor 150 may select the second ROIs.

Figure 5:
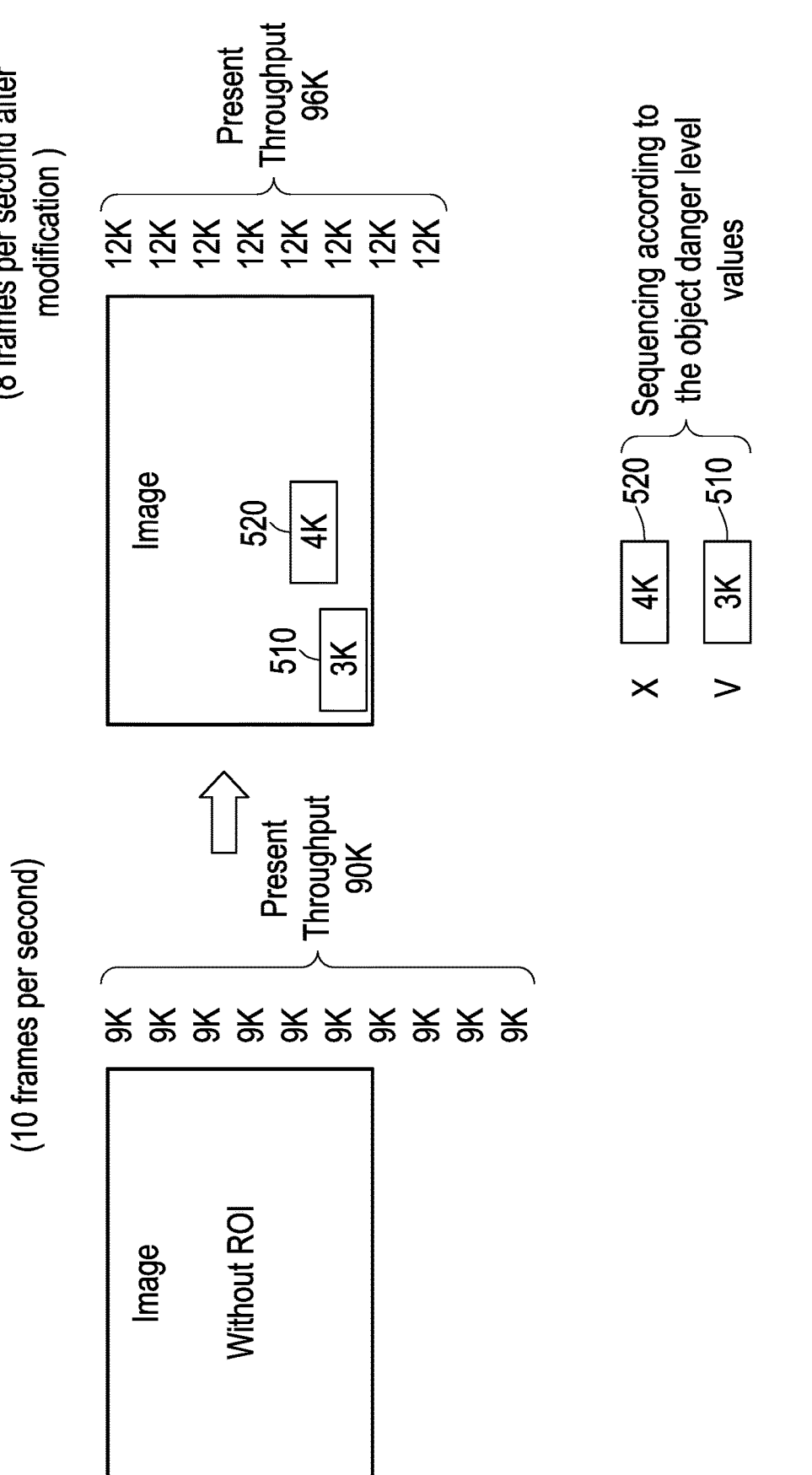
FIG. 5 is a schematic diagram of selecting a region of interest in an image according to yet another embodiment of the present disclosure.

FIG. 5 is a schematic diagram of selecting regions of interest in an image according to yet another embodiment of the present disclosure. Please refer to FIG. 1 and FIG. 5 at the same time. In the embodiment, it is assumed that the processor 150 obtains the ROI 510 and the ROI 520 by using images, and it is assumed that the object danger level value of the ROI 510 is greater than the object danger level value of the ROI 520. The processor 150 may use the ROI 510 with the highest object danger level value as the first ROI.

In the embodiment, it is assumed that the maximum throughput of the electronic device 100 is "100K byte/s", and it is assumed that the minimum resolution data size value of a single image without ROI in the image shown in FIG. 5 is "9K bytes", and it is assumed that the number of frames per second is "10". The processor 150 may use the maximum throughput of "100K bytes/s" and the number of frames per second "10" to determine the maximum data size value per frame to be "10K bytes/frame".

As shown in FIG. 5, it is assumed here that ROI 510 (i.e. the first ROI) corresponds to the transmission bandwidth value of the first ROI, which is "3K bytes", and the ROI 520 corresponds to the transmission bandwidth value of the ROI, which is "4K bytes".

In the embodiment, when the sum of the transmission bandwidth value of the first ROI and the minimum resolution data size value of a single image without ROI in the image is greater than the maximum data size value per frame, the processor 150 may adjust the number of frames per second, based on the maximum throughput, the transmission bandwidth value of the first ROI, and the minimum resolution data size value of a single image without ROI. As shown in FIG. 5, since the sum of the transmission bandwidth value of the first ROI, which is "3K bytes", and the minimum resolution data size value of a single image without ROI, which is "9K bytes", is greater than the maximum data size value per frame, which is "10K bytes" (9K+3K>10K), the processor 150 may adjust the number of frames per second "10" based on the maximum throughput, which is "100K byte/s", the transmission bandwidth value of the first ROI, which is "3K bytes", and the minimum resolution data size value of a single image without ROI, which is "9K bytes". In detail, since the throughput per frame at this moment is the sum "12K bytes" of the minimum resolution data size value "9K bytes" of a single image without ROI and the transmission bandwidth value of the first ROI "3K bytes", the processor 150 may adjust the number of frames per second to "8". In other words, after the number of frames per second being adjusted to "8", the present throughput is "96K bytes/s", and therefore the present throughput may be less than the maximum throughput, which is "100K bytes/s".

To sum up, the electronic device and method for selecting ROIs in an image of the present disclosure may select a first ROI from the multiple ROIs by using the object danger level values. In particular, the object danger level value of the first ROI may be the ROI corresponding to the highest object danger level value among the multiple ROIs. Based on this, the most dangerous ROI may be selected. Furthermore, it may also be determined whether the second ROI may be selected, based on the minimum resolution data size value of a single image without ROI in the image, the transmission bandwidth value of the first ROI, and the maximum data size per frame, or decide that the number of frames per second needs to be adjusted, which improves the flexibility of selecting ROIs from the image.

What is claimed is:

1. An electronic device for selecting regions of interest (ROIs) in an image, comprising:
   a transceiver; and
   a processor coupled to the transceiver and configured to:
   receive images through the transceiver;
   obtain a plurality of ROIs by using the images, wherein each of the plurality of ROIs corresponds to an object danger level value;
   use the object danger level value to select a first ROI from the plurality of ROIs; and
   use a maximum throughput and a number of frames per second to determine a maximum data size value per frame.

2. The electronic device of claim 1, wherein the plurality of ROIs comprises the first ROI and a plurality of other ROIs, and the object danger level value corresponding to the first ROI is greater than the object danger level value corresponding to each of the plurality of other ROIs.

3. The electronic device of claim 1, wherein the first ROI corresponds to a transmission bandwidth value of the first ROI, wherein a sum of a minimum resolution data size value of a single image without ROI in the image and the transmission bandwidth value of the first ROI is less than or equal to the maximum data size value per frame.

4. The electronic device of claim 1, wherein the first ROI corresponds to a transmission bandwidth value of the first ROI, wherein a sum of a minimum resolution data size value of a single image without ROI in the image and the transmission bandwidth value of the first ROI is less than or equal to the maximum data size value per frame.

5. The electronic device of claim 1, wherein the first ROI corresponds to a transmission bandwidth value of the first ROI, and the plurality of ROIs comprise the first ROI and a plurality of other ROIs, wherein the processor is further configured to:
   select a second ROI from the plurality of other ROIs, wherein the second ROI is different from the first ROI, wherein the second ROI corresponds to a transmission bandwidth value of the second ROI, and a sum of a minimum resolution data size value of a single image without ROI in the image, the transmission bandwidth value of the first ROI, and the transmission bandwidth value of the second ROI is less than or equal to the maximum data size value per frame.

6. The electronic device of claim 1, wherein the first ROI corresponds to a transmission bandwidth value of the first ROI, wherein the processor is further configured to:
   when a sum of the transmission bandwidth value of the first ROI and a minimum resolution data size value of a single image without ROI in the image is greater than the maximum data size value per frame, adjust the number of frames per second based on the maximum throughput, the transmission bandwidth value of the first ROI, and the minimum resolution data size value of the single image without ROI.

7. The electronic device of claim 1, wherein the object danger level value is Time to Collision (TTC).

8. A method for selecting ROIs in an image, comprising:
receiving images;
obtaining a plurality of ROIs by using the images, wherein each of the plurality of ROIs corresponds to an object danger level value;
selecting a first ROI from the plurality of ROIs by using the object danger level value; and
determining a maximum data size value per frame by using a maximum throughput and a number of frames per second.

9. The method of claim 8, wherein the plurality of ROIs comprise the first ROI and a plurality of other ROIs, and the object danger level value corresponding to the first ROI is greater than the object danger level value corresponding to each of the plurality of other ROIs.

10. The method of claim 8, wherein the first ROI corresponds to a transmission bandwidth value of the first ROI, wherein a sum of a minimum resolution data size value of a single image without ROI in the image and the transmission bandwidth value of the first ROI is less than or equal to the maximum data size value per frame.

11. The method of claim 8, wherein the first ROI corresponds to a transmission bandwidth value of the first ROI, wherein a sum of a minimum resolution data size value of a single image without ROI in the image and the transmission bandwidth value of the first ROI is less than or equal to the maximum data size value per frame.

12. The method of claim 8, wherein the first ROI corresponds to a transmission bandwidth value of the first ROI, and the plurality of ROIs comprise the first ROI and a plurality of other ROIs, wherein the method further comprises:
selecting a second ROI from the plurality of other ROIs, wherein the second ROI is different from the first ROI, wherein the second ROI corresponds to a transmission bandwidth value of the second ROI, and a sum of a minimum resolution data size value of a single image without ROI in the image, the transmission bandwidth value of the first ROI, and the transmission bandwidth value of the second ROI is less than or equal to the maximum data size value per frame.

13. The method of claim 8, wherein the first ROI corresponds to a transmission bandwidth value of the first ROI, wherein the method further comprises:
when a sum of the transmission bandwidth value of the first ROI and a minimum resolution data size value of a single image without ROI in the image is greater than the maximum data size value per frame, adjusting the number of frames per second based on the maximum throughput, the transmission bandwidth value of the first ROI, and the minimum resolution data size value of the single image without ROI.

14. The method of claim 8, wherein the object danger level value is TTC.

* * * * *